United States Patent [19]

MacLeay et al.

[11] 4,075,286

[45] Feb. 21, 1978

[54] PREPARATION OF BLOCK POLYMERS USING POLYAZO SEQUENTIAL FREE RADICAL INITIATORS

[75] Inventors: Ronald Edward MacLeay, Williamsville; Chester Stephen Sheppard, Tonawanda, both of N.Y.

[73] Assignee: Pennwalt Corporation, Philadelphia, Pa.

[21] Appl. No.: 474,739

[22] Filed: May 30, 1974

Related U.S. Application Data

[60] Division of Ser. No. 234,377, March 13, 1972, abandoned, which is a continuation-in-part of Ser. No. 752,752, Aug. 15, 1968, Pat. No. 3,649,614.

[51] Int. Cl.$^2$ .................. C07C 107/02; C07C 107/04; C08L 51/00; C08L 53/00
[52] U.S. Cl. .................................... 260/877; 260/152; 260/163; 260/169; 260/173; 260/174; 260/192; 260/193; 260/871; 260/874; 260/875; 260/876 B; 260/878 R; 260/880 B; 260/881; 260/884; 260/885; 260/886

[58] Field of Search ............... 260/192, 174, 864, 871, 260/874, 875, 897, 877

[56] References Cited

U.S. PATENT DOCUMENTS

| | | | |
|---|---|---|---|
| 3,428,583 | 2/1969 | Lasman | 260/174 X |
| 3,652,724 | 3/1972 | Shimomura et al. | 260/877 |
| 3,812,095 | 5/1974 | Sheppard et al. | 260/192 |

*Primary Examiner*—Floyd D. Higel

[57] ABSTRACT

A process for preparing a block polymer by first forming a polymer having azo functions by reacting vinyl polymer and a polyazo compound under conditions so that one of the azo functions rupture leaving the other azo function in tact; then, vinyl monomer is reacted with the polymer to produce the block copolymer. The polyazo compounds must contain at least one alkyl or aryl thio or oxa group alpha to at least one of the azo groups in the connecting chain between the azo groups to be useful as the sequential generator of free radicals.

4 Claims, No Drawings

PREPARATION OF BLOCK POLYMERS USING POLYAZO SEQUENTIAL FREE RADICAL INITIATORS

CROSS-REFERENCE TO RELATED APPLICATIONS

This is a division, of application Ser. No. 234,377, filed Mar. 13, 1972 now abandoned which in turn is a continuation-in-part of application Ser. No. 752,752, filed Aug. 15, 1968 (now U.S. Pat. No. 3,649,614).

BACKGROUND OF THE INVENTION

(1) The Field of the Invention

This invention relates to new polyazo compounds wherein at least two different azo functions are present. Also the invention relates to a method of providing free radicals in sequence wherein a novel polyazo compound, as defined, is used as the source of sequential free radicals. More particularly the invention relates to the preparation of vinyl polymers containing functional azo groups and to block copolymerization using such vinyl-azo polymers.

(2) The Prior Art

Compounds havng more than one azo function have been reported but in all cases the azo functions are identical. Sequential free radical generation would not be observed with the prior art compounds. Such prior art is reported in: U.S. Pat. No. 2,554,141; U.S. Pat. No. 3,244,692; Neugebauer et al, Ann. 706, 107 (1067); Bellamy et al, J. Chem. Soc. C, 1966, 1989; Easer et al, Gummi 11, WT 57–62 (1958).

BRIEF SUMMARY OF THE INVENTION

This invention relates to:

A. New alkyl and aralkyl polyazoalkanes containing at least one alkyl or aryl thia or oxa alpha to at least one of the azo groups in the connecting chain (—A—B—A'—) between the azo groups as represented by the formula $$(C-N=N-A-B-A'-N)_n(N-C')_{2-n} \quad (I),$$

where:

(a) $n$ is 1 or 2;

(b) C and C' must be different unless —A—B—A' is an unsymmetrical diradical and are selected from

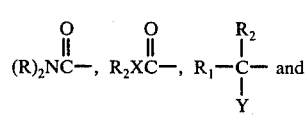

aryl of 6–14 carbons (preferably phenyl);

(c) A and A' can be the same or different, either A or A' being

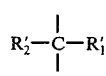

and the other being

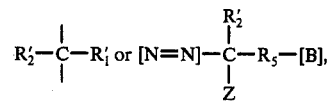

where [N=N] and [B] are used to indicate the relationship of A or A' to the azo and B groups;

(d) B is selected from

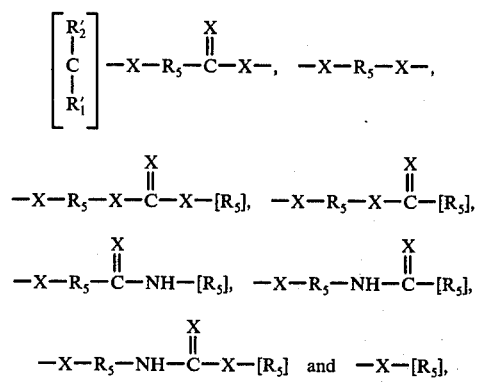

where [R$_5$] indicates that the B radical in question is connected to R$_5$ of the A or A' diradical

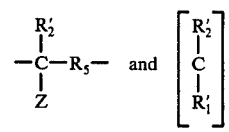

indicates the relationship of B thereto;

(e) X is sulfur or oxygen;

(f) Y is selected from lower alkyl of 1–4 carbons, —CN,

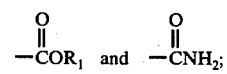

(g) Z is selected from —N, —Cl —Br, —N$_3$, —XCN, —R$_1$,

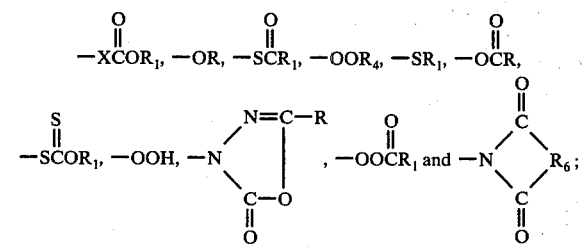

(h) R is selected from hydrogen, lower alkyl of 1–6 carbons (preferably 1–4), and aryl of 6–14 carbons (preferably phenyl);

(i) R$_1$ and R'$_1$ can be the same or different and are selected from lower alkyl of 1–8 carbons (preferably 1–4), cycloalkyl of 3–10 carbons (preferably 4–8), aralkyl of 7–12 carbons (preferably 7–10), and aryl of 6–14 carbons (preferably phenyl);

(j) R$_2$ and R'$_2$ can be the same or different and are alkyl of 1–10 carbons (preferably 1–4) or cycloalkyl of 3–10 carbons (preferably 4–8);

(k) $R_1$ and $R_2$, $R'_2$ and $R_5$, and/or $R'_1$ and $R'_2$ can, together with the tertiary carbon linked to the azo group, form a cycloalkyl ring having 4–12 carbons (preferably 5–8);

(l) $R_4$ is tertiary-alkyl of 4–8 carbons;

(m) $R_5$ is selected from aliphatic diradicals having 1–20 carbons (commonly 1–12, preferably 1–6) or aromatic-aliphatic diradicals having 7–20 carbons (commonly 7–12, preferably 7–10) which diradicals are terminated by carbon atoms and which optionally contain one or more (preferably 1–3) non-adjacent oxygen, sulfur or nitrogen atoms in the backbone structure, and from aromatic diradicals having 6–12 (preferably 6) carbons; and (n) $R_6$ is selected from lower alkylene or cycloalkylene of 2–10 carbons (preferably 2–8), phenylene and phenylene containing one substituent selected from alkyl (preferably 1–4 carbons) or cycloalkyl (preferably 4–8 carbons) of up to 10 carbons and an aromatic radical of 6–12 carbons (preferably 6);

it being understood in the above definitions that R, $R_1$, $R_2$, $R'_1$, $R'_2$, $R_5$ and $R_6$ can additionally be substituted with non-interfering substituents such as cyano, chloro, bromo, lower alkoxycarbonyl, alkoxy or aryloxy, and that the aryl group defined for C and C' can additionally be substituted with halo (F, Cl, Br), cyano, lower alkyl, aryl (such as phenyl), alkoxy (such as methoxy and ethoxy), aryloxy (such as phenyloxy) and carboalkoxy (such as carbmethoxy and carbethoxy); and B. Methods using Compounds (I) for (1) The sequential generation of free radicals by decomposing one of its azo functions while leaving the other azo functions intact and subsequently decomposing the other azo functions; and (2) preparing azo-containing vinyl polymers by decomposing said compound (I) in the presence of a vinyl monomer under conditions causing one type of azo function to rupture; and (3) preparing block copolymers by reacting vinyl monomer with a polymer as prepared in 2. above under conditions to rupture the remaining azo function(s).

DETAILED DESCRIPTION OF INVENTION

Compounds

This invention is directed to polyazo compounds (I) having a connecting link B between the azo groups which is directly attached to at least one carbon, which carbon in turn is directly attached to an azo function by a sulfur or an oxygen atom, and which sulfur or oxygen atom in turn is connected to an aliphatic or an aromatic group, i.e.

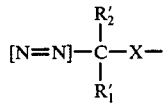

must be present in the molecule where X is connected to an aliphatic or an aromatic group.

The above definitions of C, C', A, A' and B are intentionally broad because they can have a wide variety of structures within the above definitions without affecting their general utility or the ability to make the compound. Numerous examples are set forth hereinafter.

Utility

These new compositions are free radical generators, polymerization initiators for vinyl monomers, curing agents for polyester resins, initiators for free radical initiated chemical reactions, blowing agents for producing foamed polymers and plastics, selective oxidizing agents and generators of reactant free radicals.

The preferred use of the polyazo compounds of this invention is for the sequential generation of free radicals. An especially preferred use is in the preparation of block copolymers by (1) forming a polymer having azo functions present by reacting vinyl monomer and a polyazo compound I under vinyl polymerization conditions, controlling conditions in order to cause one type of azo function to rupture leaving the other type of azo function intact, said rupture having the effect of initiating the polymerization; and (2) reacting vinyl-type monomer with the polymer of step (1) under conditions to rupture the azo-carbon linkages of said step (1) polymer to produce a block polymer product.

The azo function on the azo-containing polymer initially formed above can also be used to generate a free radical site on the polymer for other applications such as: crosslinking, grafting, adhesion, lamination, and attaching other functions to the polymer which would impart desirable properties such as dyeability, antistatic, and light, heat and/or oxidative stability.

Such azo-containing polymers can be stored, shipped and handled prior to the subsequent operation for any length of time desired provided that the polymer is not subjected to conditions that will cause the azo function to decompose or rupture prematurely.

Sequential generation of free radicals is also useful in other applications such as in the homopolymerization of monomers such as styrene and ethylene.

Another application is to use one or more of the azo functions to gel a resin such as an unsaturated polyester-vinyl monomer blend and to use the other azo functions to subsequently cure the resin.

Other applications for sequential free radical generation from the novel polyazo compounds of this invention will become apparent to those skilled in the art.

Method of Preparation

The polyazo compounds of this invention are prepared by linking together two or more aliphatic azo compounds by procedures well known in the art. Such procedures include the Williamson ether synthesis, esterification, carbonate and urethane formation and amide formation. These procedures work well with both the oxygen and sulfur derivatives.

The azo compounds containing acylating functions which are required as intermediates for many of the polyazo compounds described in this disclosure are described in copending application Ser. No. 37,311, filed May 14, 1970, now U.S. Pat. No. 3,752,802. These compounds readily react with azos containing hydroxyl, thio, and amino end groups to form ester, thioester, carbonate, thio-carbonate, amide, urethane, etc. linkages between the azo groups. The intermediate azos containing the hydroxyl, thio or amino end groups can be synthesized from hydroxy, thio or amino ketones. In addition the preparation of tertiary-alkyl, cycloalkyl or aralkyl azoalkanes containing one α(β-hydroxyalkylthio)group is described in copending application Ser. No. 88,250, filed Nov. 9, 1970, now abandoned. The symmetrical α,α'(β-hydroxyalkylthio)azo compounds can be prepared by Benzing's method using mercaptoalkanols (U.S. Pat. No. 3,282,912 and Can. Pat. No. 750,380). Similarly, the α-chloro azo compounds described in copending application Ser. No. 149,061, filed June 1, 1971, and the symmetrical α,α'dichloro azo compounds of Benzing can be reacted with other nucleophilic reagents containing functional end groups such as thioglycolic esters, 2-aminoethanol, 2-aminoethane thiol and other amino or hydroxy substituted thiols.

Methods of Polymerization

The method inventions are directed to the use of compounds of the invention to prepare block polymers by a sequential procedure wherein a compound I is used to initiate vinyl polymerization to prepare a polymer including an azo function as a part of the polymer. The azo containing polymer is then further polymerized with vinyl monomer under conditions to rupture the azo function whereby the block polymer is formed. These novel compounds are useful as sequential free radical generators, i.e. one or more of the azo groups can be preferentially decomposed to generate free radicals for a particular application (e.g. vinyl monomer polymerization) keeping at least one azo group substantially undecomposed for a later application (e.g. formation of a block copolymer with another vinyl monomer polymerization) and vice-versa. These sequential and/or preferential decompositions of the azo portions of the molecule can be accomplished for example by taking advantage of the difference in the thermal rates of decomposition of the various azo portions of the molecule. A second method, also based on the different thermal rates of decomposition is to use the same temperature but different reaction times.

A third method would be to decompose the azos photolytically taking advantage of the difference in wavelength of the ultraviolet maximum for conjugated and nonconjugated azos. This technique would require that at least one of the azo groups is conjugated and at least one of the azo groups is not conjugated. A fourth method would be to decompose at least one of the azos photolytically, taking advantage of the difference in wavelength of the ultraviolet maximum for conjugated and nonconjugated azos, and then decompose the other azo(s) thermally or vice-versa. Again this method requires a difference in the wavelengths of ultraviolet absorption. A fifth method would be to activate an azoester or azoamide portion of the molecule with a Lewis acid and then decompose the other azo(s) thermally or photolytically in a second step or vice-versa. A sixth method would be to activate an azoester or azoamide portion of the molecule by hydrolysis and then decompose the other azo(s) thermally or photolytically in a second step or vice-versa. The last two methods require that at least one of the azo groups is an azoester or an azoamide and that at leat one of the azo groups is not an azoester or an azoamide.

Thus, by taking advantage of the differences in the physical and chemical properties of the azo groups contained in the novel di- or polyazo compound of structure I, a variety of techniques can be used for sequential free radical generation.

Sequential free radical generation is very useful in the vinyl polymerization field. Block copolymers can be made from any combination of polymerizable vinyl monomers. Sequential free radical generation is also employed in the conventional polymerization of ethylene and styrene. The present art accomplishes this by using two or more polymerization initiators of different thermal stability.

Conventional polymerization techniques, i.e. bulk, solution, suspension or emulsion polymerization, can be used. The choice will depend upon the normal reasons for choosing one technique over another e.g. water and oil solubility of the monomer and/or initiator; desired molecular weight range of the polymer; temperature (or exotherm) control, etc.

The temperatures at which the polymerizations are carried out will depend upon the polymerization technique; the monomer, solvent or suspending medium; and the physical properties desired in the polymer; but most of all upon the sequential azo initiator and the method chosen to decompose the various azo portions of the initiator. Activation of azo esters and azo amides with Lewis acids can be used to lower their decomposition temperatures to room temperature. Activation of azo esters by hydrolysis can be used to lower their decomposition temperatures to the freezing point of the aqueous solution. The decomposition rates of the various azo groups upon exposure to ultraviolet irradiation will be dependent upon the wavelength of the ultraviolet source. Conjugated azos such as azo esters and azo amides absorb ultraviolet light much stronger and absorb at a higher wavelength than the aliphatic azos. Consequently the conjugated azos can be preferentially decomposed in the presence of the aliphatic azo by using a wavelength corresponding to the wavelength of the ultraviolet maximum for the conjugated azo or vice versa.

The temperatures used for the thermal decompositions of the various azo portions of the initiator will depend upon the thermal stability (half-life) of the various azo groupings in the molecule. These half-lives may be determined quantitatively for each sequential azo initiator by conventional methods, i.e. gas evolution, ultraviolet or gas chromatographic analytical techniques, to determine the rate of disappearance of each azo group at any given temperature. However it is not necessary to accurately determine the half-life of each portion since most half-lives can be predicted, within a few degrees, from the analogous monomeric azo compounds. Some ten-hour half-life temperature ranges of some typical azo structures are given in Table I. Model compounds of this type have been used to estimate the ten-hour half-lives on the compounds prepared in the working examples.

Upon examination of Table I, it will be noted that the half-life of the azo function is dependent on the functionalities bonded to the carbon atoms bonded to the azo nitrogens. For example, phenyl azos are thermally more stable than t-alkyl azos. Azoester and azoamide are more stable than the corresponding t-alkylazos. Overberger (C. G. Overberger et. al, J. Am. Chem. Soc. 73, 2618 (1951)) has shown that steric effects in the R and R' groups of compounds of the following type

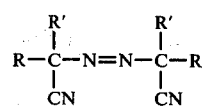

play an important role in the half-lives of the compounds. Overberger found that Beta branching in R and R' reduces the stability of the azo compound. He also found that if R was a cyclopropyl group, the stability of the azo compound was drastically reduced. Overberger (C. G. Overberger et. al, J. Am. Chem. Soc. 75, 2078 (1953)) also found that if R and R' were connected, that the size of the resultant cycloalkyl ring also had an effect on the stability of the azo group. We have found that these effects hold up for compounds having substituents other than cyano groups and also for unsymmetrical azo compounds. In the unsymmetrical azo compounds where the alterations are only made on one side of the molecule, the same effects occur but to a lesser extent. We have also found that in compounds of the following type

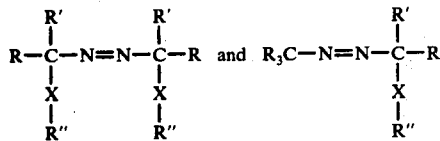

where X = oxygen or sulfur:

that the stability decreases as R" changes from aryl to primary alkyl to secondary alkyl to tertiary alkyl.

We have also found that in compounds of the following type

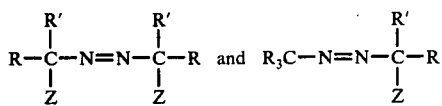

that the stability of the azo compounds is very dependent on the nature of Z. In general, the stability of these azos decreases in the following order:

alkyl > o-aryl > o-alkyl > s-aryl > s-alkyl > SCN > aryl > CN > OOH > oo-t-alkyl Other Z groups fall within this range but vary in their exact position depending on R and R'.

Table I demonstrates how changes in R, R', R", X and Z affect the 10 hour half-lives of these compounds.

Table I

Ten-Hour Half-Life Temperatures of Various Azo Compounds

| General Structure | | 10 Hour t½ Range °C |
|---|---|---|
| R—C(R')(CN)—N=N—C(R')(CN)—R | R = R' = CH$_3$ | 65 |
| | R = CH$_3$ R' = i-C$_4$H$_9$ | 52 |
| | R = CH$_3$ R' = CH$_2$—CH$_2$—COR'' | 65 |
| (CH$_3$)$_3$C—N=N—C(R)(CN)—R' | R = R' = CH$_3$ | 79 |
| | R = CH$_3$ R' = i-C$_4$H$_9$ | ~70 |
| | R = CH$_3$ R' = CH$_2$—CH$_2$COR'' | 76–79 |
| | R = CH$_3$ R' = CH$_2$OCR'' | 77– |
| R—C(R')(CH$_2$OC(=O)CH$_3$)—N=N—C(R')(CH$_2$OC(=O)CH$_3$)—R | R = R' = CH$_3$ | 162 |
| (CH$_3$)$_3$C—N=N—COR | R = i-C$_3$H$_7$ | ~130 |
| R"OC(=O)—N=N—C(R)(CN)—R' | R = CH$_3$ R' = (CH$_2$)$_3$OH R" = C$_2$H$_5$ | ~130 |
| (CH$_3$)$_3$C—N=N—C(=O)—NH$_2$ | | 105 |
| C$_6$H$_5$—N=N—C(CH$_3$)(CN)—CH$_3$ | | ~130 |
| CH$_3$—C(CH$_3$)(CN)—N=N—C(=O)—NH$_2$ | | 107 |

Table I-continued
Ten-Hour Half-Life Temperatures of Various Azo Compounds

| General Structure | | 10 Hour t½ Range ° C |
|---|---|---|
| $(CH_3)_3C-N=N-\underset{\underset{\underset{CH_3}{C=O}}{O}}{\overset{CH_3}{\underset{|}{C}}}-CH_2-\underset{\underset{CH_3}{\overset{|}{O}}}{\overset{CH_3}{\underset{|}{C}}}-CH_3$ | | 105 |
| $R-\underset{\underset{CH_3}{\overset{|}{O}}}{\overset{R'}{\underset{|}{C}}}-N=N-\underset{\underset{CH_3}{\overset{|}{O}}}{\overset{R'}{\underset{|}{C}}}-R$ | R = CH₃ R' = i-C₄H₉ | 90 |
| $C_6H_5-\underset{\underset{CH_3}{\overset{|}{C}}}{\overset{CH_3}{\underset{|}{C}}}-N=N-\underset{\underset{CN}{\overset{|}{C}}}{\overset{CH_3}{\underset{|}{C}}}-CH_3$ | | 55 |
| $R-\underset{\underset{\underset{OH}{CH_2}}{CH_2}}{\overset{R'}{\underset{|}{C}}}-N=N-\underset{\underset{\underset{OH}{CH_2}}{CH_2}}{\overset{R'}{\underset{|}{C}}}-R$ (with S linkers) | R = R' = CH₃<br>R = CH₃ R' = i-C₄H₉<br>R and R' = —(CH₂)₅— | 93<br>68<br>105 |
| $(CH_3)_3C-N=N-\underset{\underset{\underset{OH}{CH_2}}{CH_2}}{\overset{R}{\underset{|}{C}}}-R'$ (with S linker) | R = R' = CH₃<br>R = CH₃ R' = i-C₄H₉<br>R and R' = —(CH₂)₅— | 127<br>113<br>133 |
| $(CH_3)_3C-N=N-\underset{\underset{R''}{\overset{|}{O}}}{\overset{R}{\underset{|}{C}}}-R'$ | R = R' = R'' = CH₃<br>R = R'' = CH₃ R' = i-C₄H₉<br>R and R' = —(CH₂)₅—R'' = CH₃<br>R = R' = CH₃ R'' = C₆H₅ | 140<br>135<br>145<br>154 |
| $(CH_3)_3C-N=N-\underset{\underset{R''}{\overset{|}{S}}}{\overset{R}{\underset{|}{C}}}-R'$ | R = R' = CH₃ R'' = —⟨O⟩—C(CH₃)₃<br>R = R' = CH₃ R'' = nC₆H₁₇ | 128<br>126 |
| | R = R' = CH₃ R' = —CH₂—CH(CH₃)₂ | 122 |
| | R = R' = CH₃ R'' = —CH(CH₃)—CH₂—CH₃ | 117 |
| | R = R' = CH₂ R'' = C(CH₃)₃ | 111 |
| | R = R' = CH₃<br>R'' = —C(CH₃)₂CH₂—C(CH₃)₃ | 112 |
| | R = CH₃ R' = i-C₄H₃<br>R'' = CH₂—CH₂—CH₃ | 114 |
| | R = CH₃ R' = i-C₄H₉<br>R'' = —CH(CH₃)₂ | 109 |

Table I-continued
Ten-Hour Half-Life Temperatures of Various Azo Compounds

| General Structure | | 10 Hour t½ Range °C |
|---|---|---|
| (CH₃)₃C—N=N—C(CH₃)(Z)—CH₂—CH(CH₃)—Z | | |
| | —O—CH₃ (top substituent), with Z variations below: | |
| | —O—C₆H₅ | 148 |
| | —O—CH₃ | 139 |
| | —S—C₆H₅ | 135 |
| | —S—C₃H₇ | 118 |
| | | 114 |
| | phthalimido (N linked to two C=O in cyclohexane-fused ring) | 116 |
| | —N₃ | 104 |
| | —SCN | 92 |
| | —C₆H₅ | 72 |
| | —CN | 70 |
| | —OOH | 30 |
| | —OOC(CH₃)₃ | 23 |

All the vinyl monomers listed can be polymerized by azo initiators. Azo initiators are commonly used in all four free-radical polymerization techniques. It is old in the art to initiate polymerization of vinyl monomers with azo initiators by irradiating the monomer-initiator solution with an ultraviolet source. It is also old in the art to activate azo esters and amides with Lewis acids.

The expression "vinyl monomer" includes all those organic compounds containing at least one $CH_2=C<$ group in their molecule. Examples of these monomers are styrene, ethylene, alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride; vinyl esters of the inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate; the vinyl esters of the unsaturated acids such as vinyl acrylate, vinyl crotonate, and vinyl methacrylate; the vinyl ethers, such as vinyl ethyl ether, vinyl butyl ether, and vinyl allyl ether; the vinyl ketones, such as vinyl butyl ketone, and vinyl ethyl ketone; and the allyl derivatives, such as allyl acetate, allyl butyrate, diallyl phthalate, diallyl adiphate, methallyl propionate, allyl chloride, methallyl chloride, allyl acrylate, methallyl methacrylate, and dienes such as butadiene, and chloroprene.

Azo initiators are also effective initiators for the copolymerization of the above-described compounds with each other or with other types of polymerizable organic compounds, particularly those containing at least one ethylenic linkage, such as the saturated esters and polyesters of the unsaturated acids, such as the maleates, fumarates, crotonates, and the like.

Examples of some of the compounds which fall within the scope of this invention include the following polyazoalkanes:

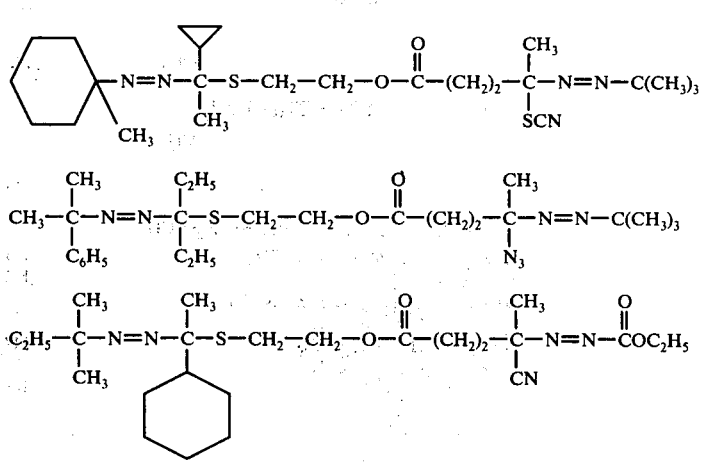

-continued
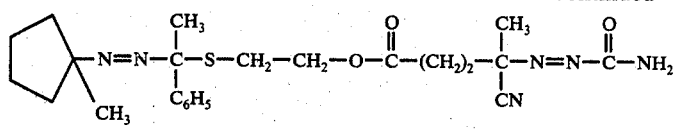
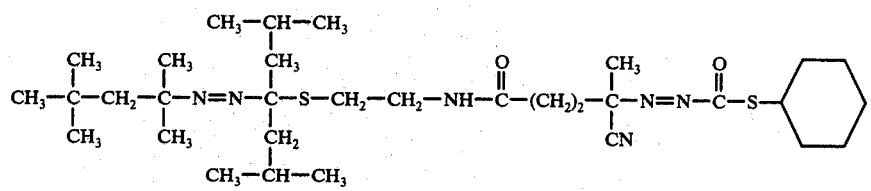
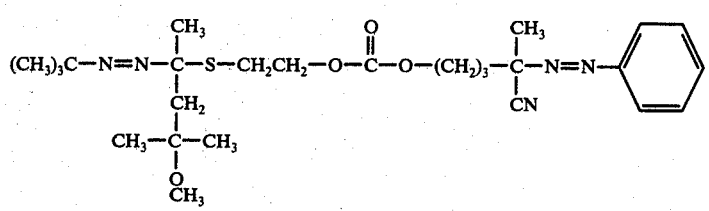
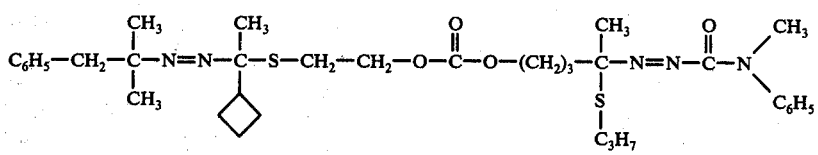
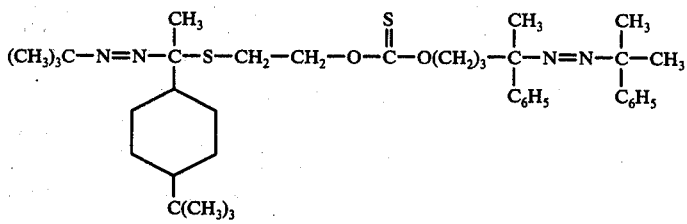
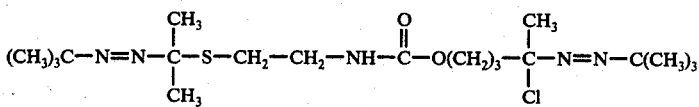
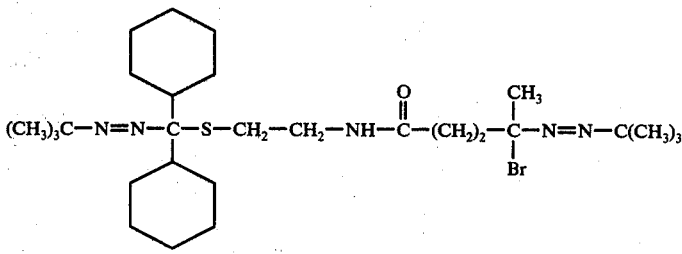
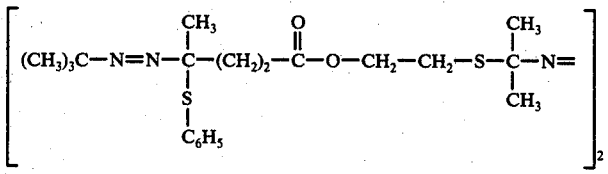
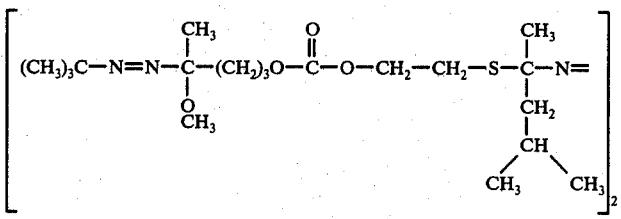

-continued
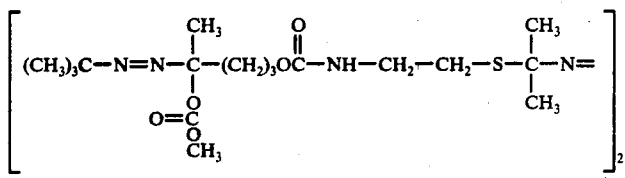
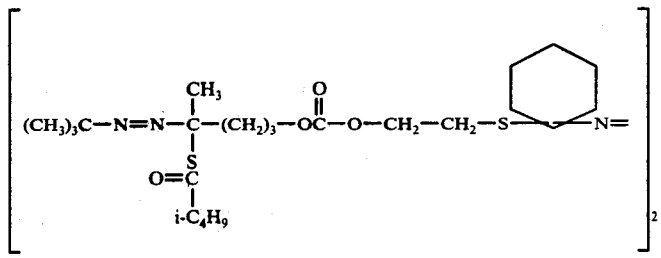
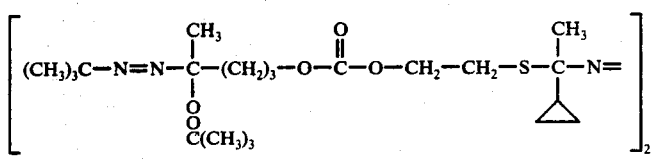
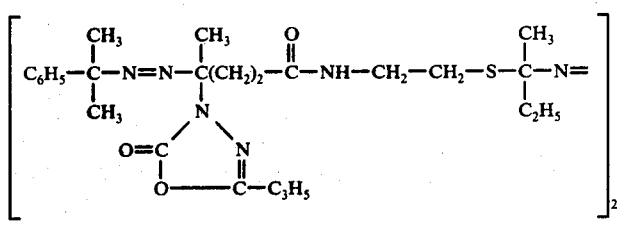
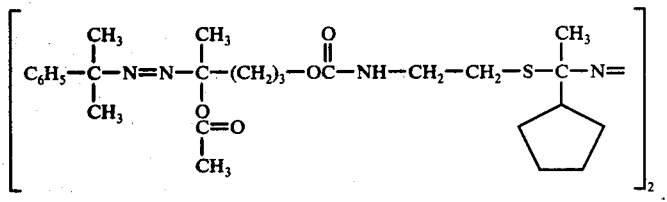
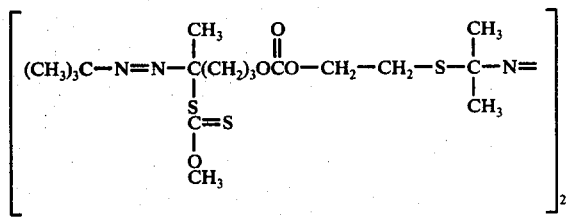
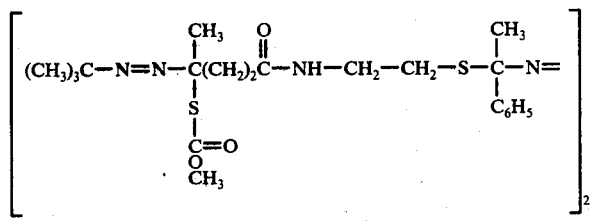

-continued
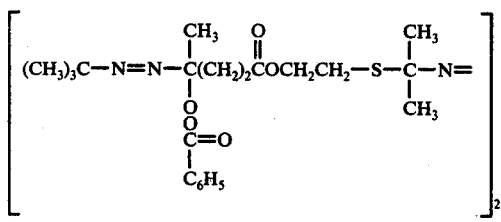
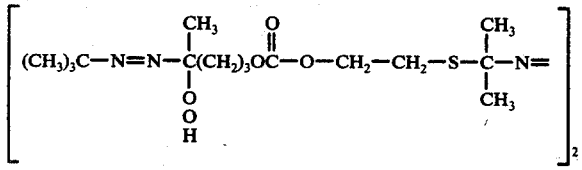
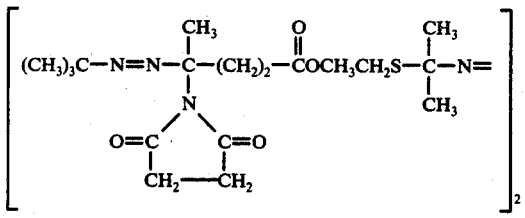
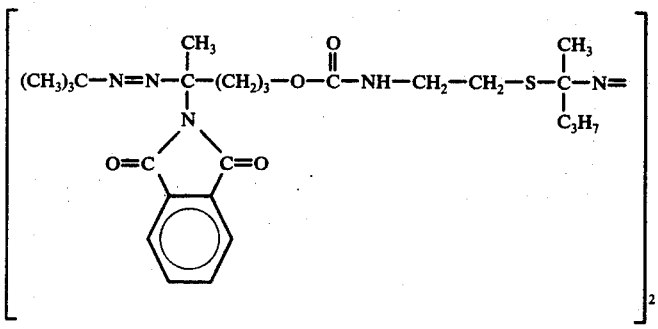
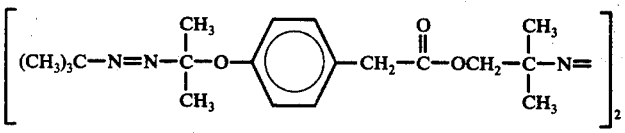
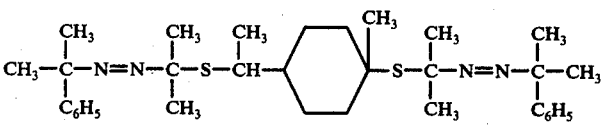
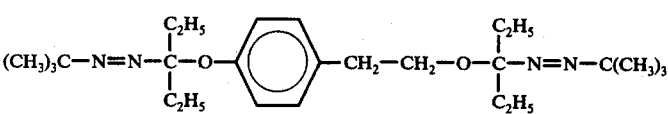
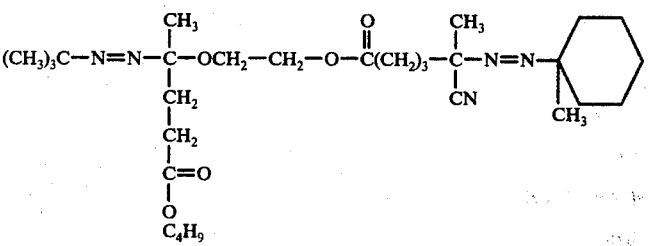

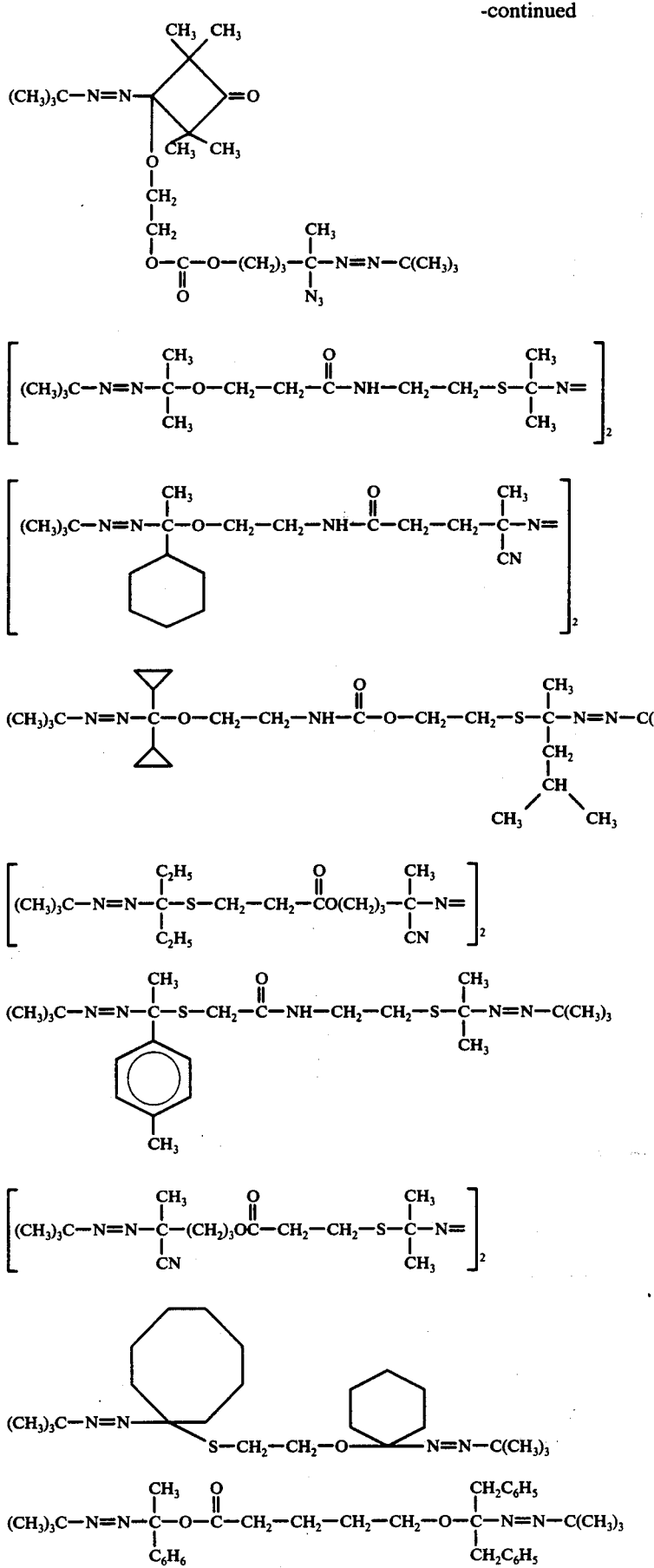

-continued
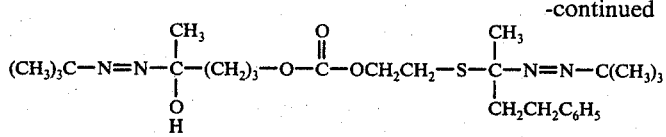
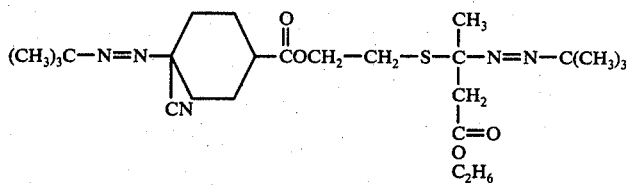
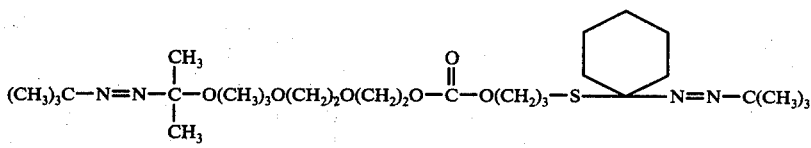
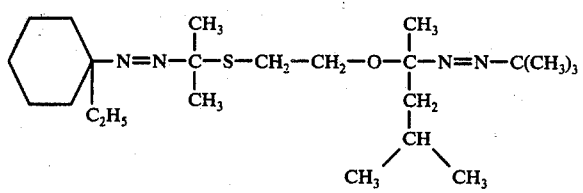
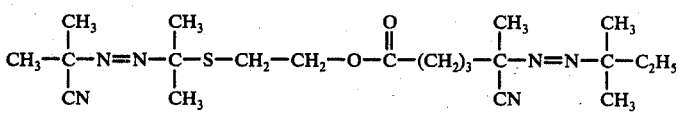
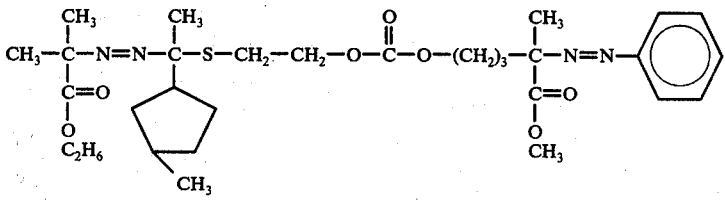
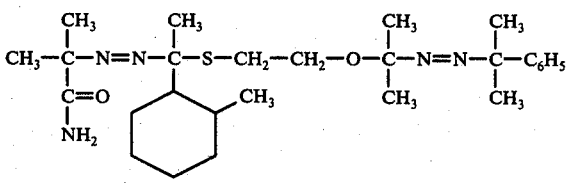
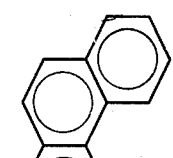
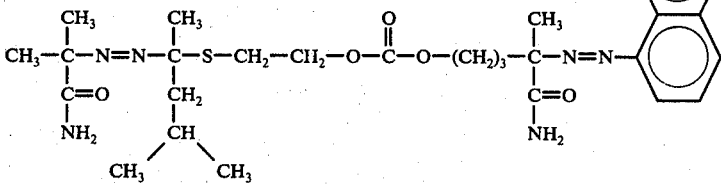
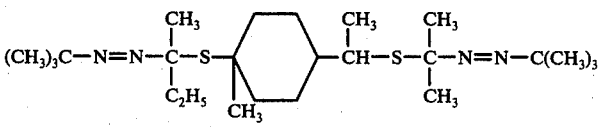

-continued
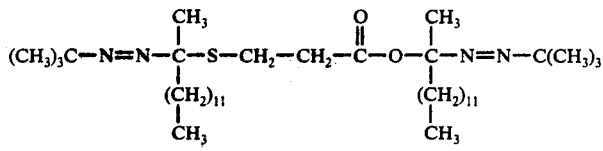
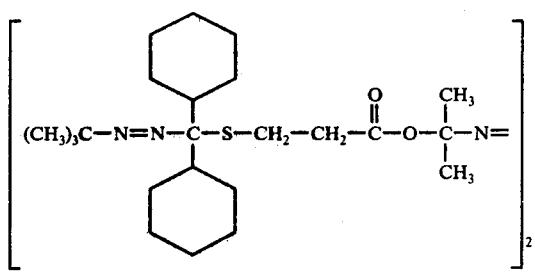
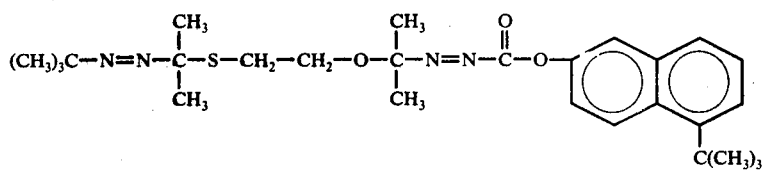
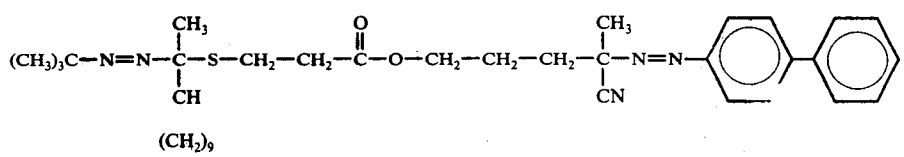
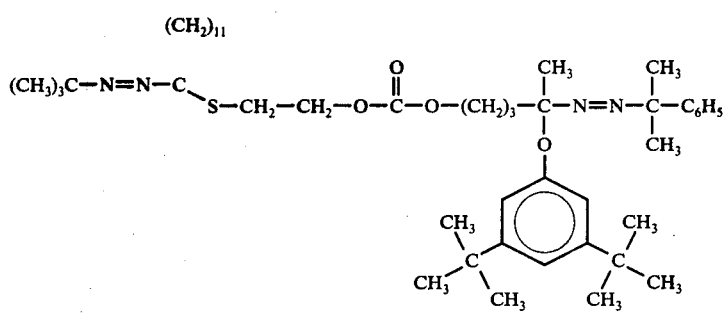
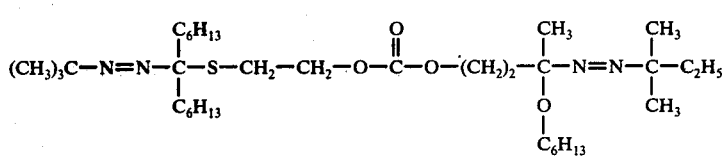
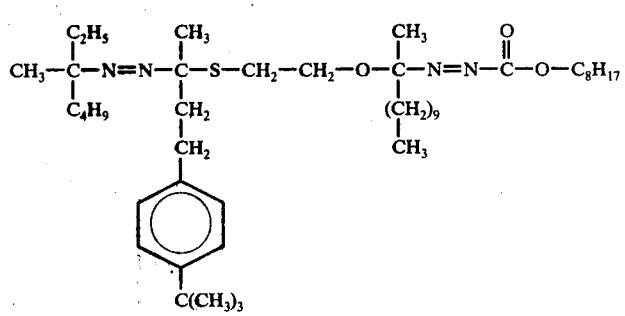

-continued
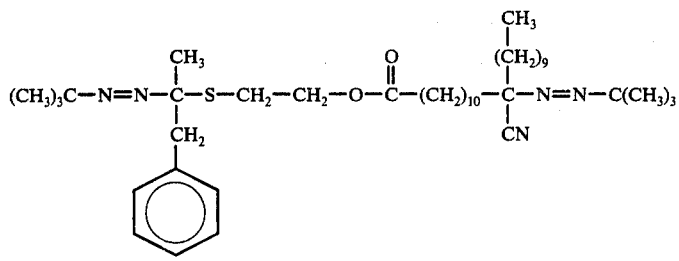
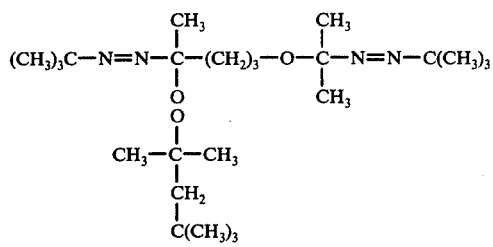
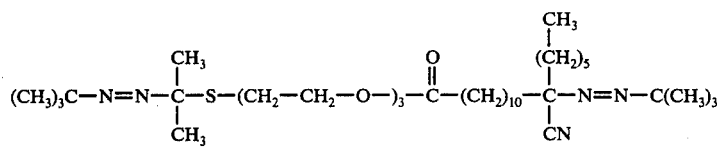
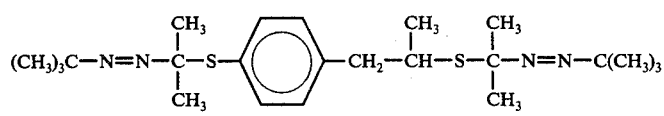
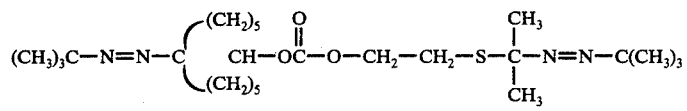
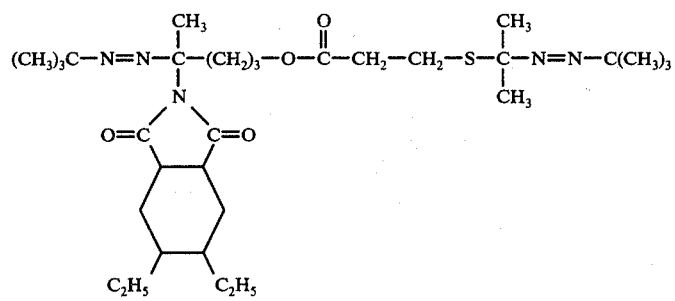
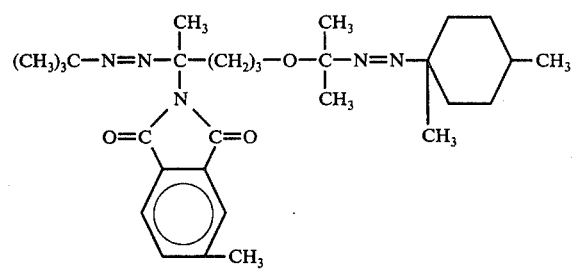
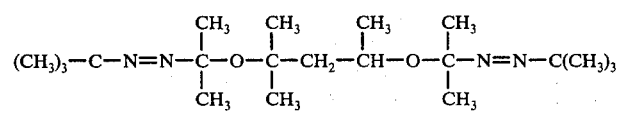

-continued

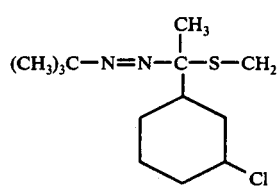 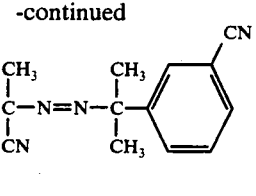

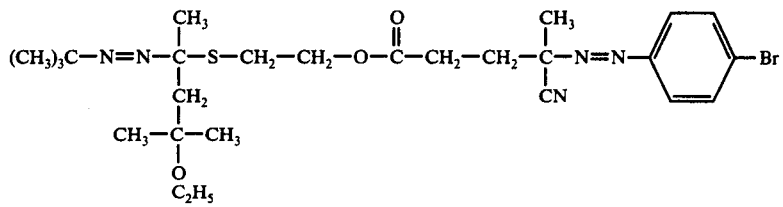 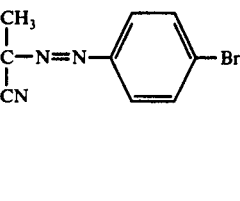

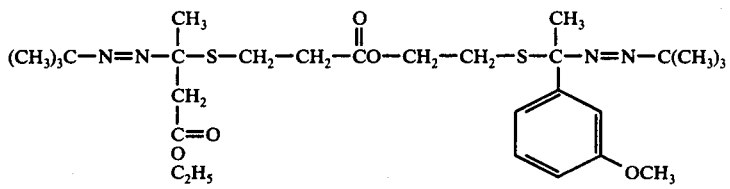 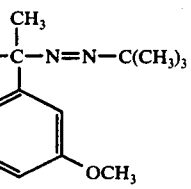

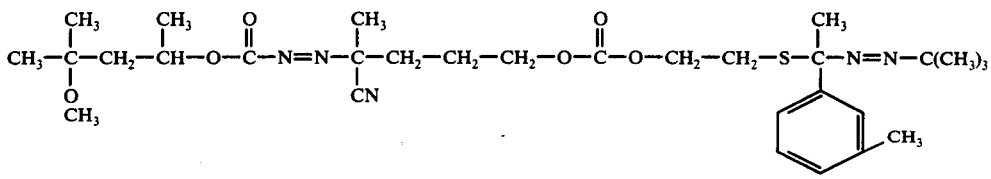 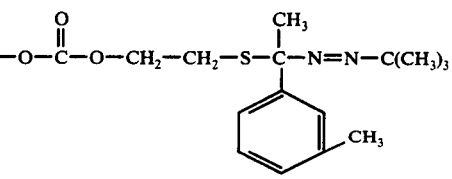

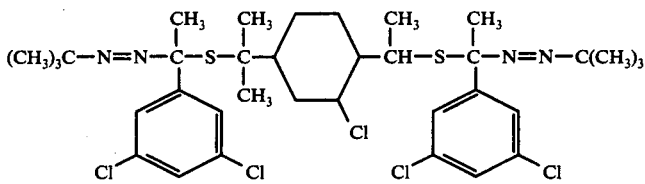 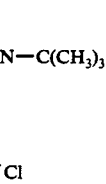

EXAMPLES

The following working examples illustrate the invention but in no way limit the scope thereof.

EXAMPLE I

Preparation of 4-t-Butylazo-4-methyl-3-thiapentyl 4-t-Butylazo-4-cyanovalerate

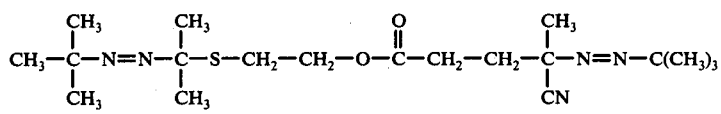

10 hr. t½ at 126° C                10 hr. t½ at 76° C (A) 4-t-Butylazo-4-cyanovaleryl chloride was prepared as described in copending application Ser. No. 37,311, filed 5/14/70.

(B) 2-t-Butylazo-2-(β-hydroxyethylthio)propane was prepared as described in copending application Ser. No. 88,250, filed 11/9/70.

(C) 4-t-Butylazo-4-methyl-3-thiapentyl 4-t-butylazo-4-cyanovalerate

To a solution of 5.1 grams (.025 moles) of 2-t-butylazo-2-(β-hydroxyethylthio)propane and 2.5 grams (.031 moles) pyridine in 50 ml of pentane in a beaker was added 5.75 grams (.025 moles) of 4-t-butylazo-4-cyanovaleryl chloride dropwise while holding the reaction temperature at 25° C ± 2° C. After the addition was complete, the reaction was stirred an additional ½ hour at 25° C, 50 ml of water added and the pentane layer separated. The pentane layer was successively washed with 25 ml of 10% HCl, 25 ml of water and 25 ml of 10% NaHCO₃ solution, dried over anhydrous Na₂SO₄, filtered and the pentane evaporated under reduced pressure to leave a viscous tan liquid weighing 9.5 grams. The product was purified by chromatographing it over alumina and eluting it with pentane. The recovery was 6.2 grams of a yellow liquid (62% yield). The infrared spectrum of the product was in agreement with the structure of the desired product.

EXAMPLE II

Block Copolymerization of Styrene and Methyl Methacrylate with 4-t-Butylazo-4-methyl-3-thiapentyl 4-t-Butylazo-4-cyanovalerate Preparation of an Azo-Containing Polystyrene from 4-t-Butylazo-4-methyl-3-thiapentyl 4-t-Butylazo-4-cyanovalerate of Example I

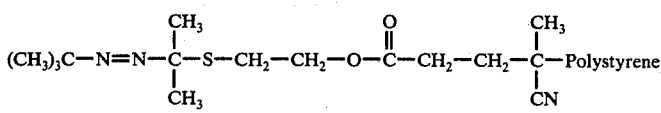

A mixture of 5.00 grams of styrene and 0.5 grams of 4-t-butylazo-4-methyl-3-thiapentyl 4-t-butylazo-4-cyanovalerate was heated at 76° C under nitrogen in a sealed test tube for 3½ hours. The test tube was cooled, cracked open and the reaction mixture precipitated in methanol. The resultant polymer was dissolved in benzene and reprecipitated from methanol twice. The purified azo-containing polymer weighed 3.86 grams (77.3% yield). Preparation of a Polystyrene-Poly(methyl methacrylate) Block Copolymer from the Azo-Containing Polystyrene of A.

A mixture of 2.50 grams of methyl methacrylate and 1.25 grams of the azo-containing polystyrene of A was heated for one hour at 126° C in a sealed tube under nitrogen. The test tube was cooled, cracked open and the reaction mixture precipitated in methanol. The resultant polymer was dissolved in benzene and reprecipitated from methanol twice. The dried product weighed 3.2 grams (85% yield).

To a 13% solution of the homopolymers in chloroform (1 part polystyrene and 1 part poly(methyl methacrylate)) was added 1 part of the block copolymer of B and the mixture shaken up. The resultant solution demixed into two layers after standing 26 hours. This compares to a demixing time of one hour for the same homopolymer solution without the block copolymer.

EXAMPLE III

Preparation of 4-t-Butylazo-4,6-dimethyl-3-thiaheptyl 4-t-Butylazo-4-cyanovalerate

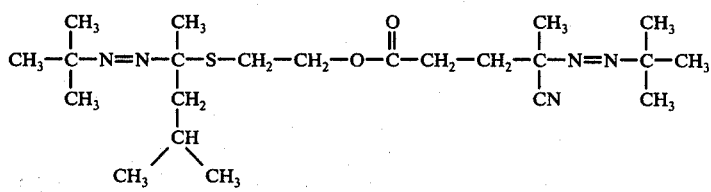

10 hr. t½ at 113° C 4-t-Butylazo-4-cyanovaleryl chloride was prepared as described in copending application Ser. No. 37,311, filed 5/14/70.

2-t-Butylazo-2-(β-hydroxyethylthio)-4-methylpentane was prepared as described in copending application Ser. No. 88,250, filed 11/9/70.

4-t-Butylazo-4,6-dimethyl-3-thiaheptyl 4-t-butylazo-4-cyanovalerate

To a solution of 6.5 grams (0.0264 moles) of 2-t-butylazo-2-(β-hydroxyethylthio)-4-methylpentane and 2.5 grams (.031 moles) of pyridine in 50 ml of pentane in a beaker was added 5.75 grams (.025 moles) of 4-t-butylazo-4-cyanovaleryl chloride dropwise while holding the reaction temperature at 25° ± 2° C. After the addition was complete, the reaction was stirred an additional ½ hour at 25° C, 50 ml of water added and the pentane layer separated. The pentane layer was successively washed with 25 ml of 10% HCl, 25 ml of water and 25 ml of 10% NaHCO₃ solution, dried over anhydrous Na₂SO₄, filtered and the pentane evaporated under reduced pressure to leave a viscous tan liquid weighing 7.3 grams (66% yield). The product was purified by chromatographing it over alumina and eluting it with pentane. Evaporation of the pentane left a yellow viscous liquid whose infrared spectrum was in agreement with the structure of the desired product.

EXAMPLE IV

Block Copolymerization of Styrene and Methyl Methacrylate with 4-t-Butylazo-4,6-dimethyl-3-thiaheptyl-4-t-Butylazo-4-cyanovalerate Preparation of an Azo-Containing Polystyrene from 4-t-Butylazo-4,6-dimethyl-3-thiaheptyl 4-t-Butylazo-4-cyanovalerate of Example III

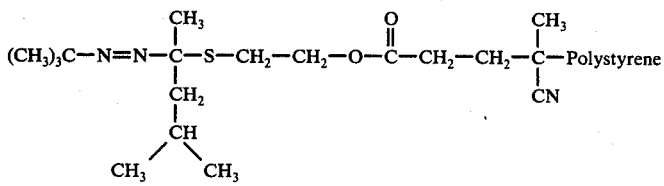

A mixture of 5.00 grams of styrene and 0.525 grams of 4-t-butylazo-4,6-dimethyl-3-thiaheptyl 4-t-butylazo-4-cyanovalerate was heated at 76° C under nitrogen in a sealed test tube for 3½ hours. The test tube was cooled, cracked open and the reaction mixture precipitated in methanol. The resultant polymer was dissolved in benzene and reprecipitated from methanol twice. The purified azo-containing polymer weighed 3.36 grams (67.3% yield).

10 hr. t½ at 76° C

Preparation of a Polystyrene-Poly(methyl methacrylate) Block Copolymer from the Azo-Containing Polystyrene of A.

A mixture of 2.00 grams of methyl methacrylate and 1.0 grams of the azo-containing polystyrene of A was heated for one hour at 113° C in a sealed tube under nitrogen. The test tube was cooled, cracked open and the reaction mixture precipitated in methanol. The resultant polymer was dissolved in benzene and reprecipitated from methanol twice. The dried product weighed 2.3 grams (77% yield).

To a 13% solution of the homopolymers in chloroform (1 part polystyrene and 1 part poly(methyl methacrylate)) was added 1 part of the block copolymer of B and the mixture shaken up. The resultant solution demixed into two layers after standing 8½ hours. This compares to a demixing time of one hour for the same homopolymer solution without the block copolymer.

EXAMPLE V

Preparation of 1-Methyl-1-(2-(t-butylazo)-2-methyl-1-thiapropyl)-4-(3-(t-butylazo)-1,1,3-trimethyl-2-thiabutyl)cyclohexane

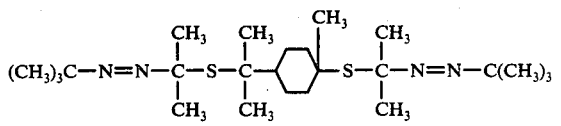

10 hr. t½ at 111° C    10 hr. t½ at 118° C 2-t-Butylazo-2-chloropropane was prepared as described in copending application Ser. No. 79,713, filed 11/9/70.

1-Methyl-1-(2-(t-butylazo)-2-methyl-1-thiapropyl)-4-(3-(t-butylazo)-1,1,3-trimethyl-2-thiabutyl)cyclohexane To a solution of 2.9 grams (.044 moles) of 85% potassium hydroxide in 50 ml of methanol in a 250 ml reaction flask equipped with a magnetic stirrer, thermometer and an addition funnel was added 4.5 grams (0.022 moles) of d-limonene dimercaptan, holding the temperature below 35° C. After the addition was complete, the reaction was stirred for 20 minutes at room temperature and 7.95 grams (0.044 moles) of 90% 2-t-butylazo-2-chloropropane added dropwise over a 15 minute period holding the reaction temperature at 20° to 25° C. After the addition was complete, the reaction was stirred for one hour at room temperature, poured into 150 ml of water and stirred until the KCl dissolved. The product was extracted with pentane, washed with 10% NaOH, water, 10% NaHCO$_3$, water, dried over anhydrous Na$_2$SO$_4$, filtered and the pentane evaporated under reduced pressure. The product weighed 9.5 grams (95% yield) and its infrared spectrum was in agreement with the structure of the desired product.

EXAMPLE VI

Preparation of Di(4-t-butylazo-4,6-dimethyl-3-thiaheptyl)4,4'-Azobis(4-methyl-3-thiapentyl)Dicarbonate

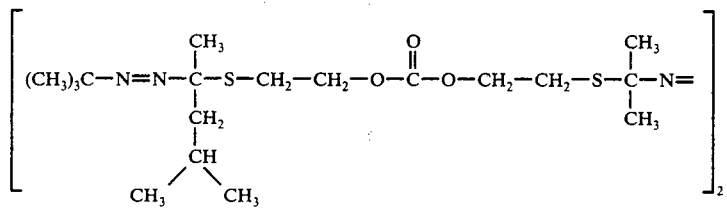

10 hr. t½ at 113° C    10 hr. t½ at 93° C 2-t-Butylazo-2-(β-hydroxyethylthio)-4-methylpentane was prepared as described in copending application Ser. No. 88,250, filed 11/9/70.

4-t-Butylazo-4,6-dimethyl-3-thiaheptyl chloroformate

To a solution of 31.5 ml (0.45 moles) of phosgene in 150 ml of pentane cooled to 0° C in a 500 ml 3 neck flask equipped with an additional funnel, thermometer, magnetic stirrer and dry ice condenser was added 73.6 grams (0.3 moles) of 2-t-butylazo-2-(β-hydroxyethylthio)-4-methylpentane dropwise through the addition funnel over 20 minutes. After the addition was over the reaction was stirred an additional 60 minutes at 0°–5° C, warmed to 15° C and the excess phosgene and pentane stripped off to leave 86.4 grams (93.5% yield) of the chloroformate.

2,2'-Azobis(2-(β-hydroxyethylthio)propane)

To a solution of 27.0 grams (0.41 moles) of 85% potassium hydroxide in 150 ml of methanol cooled to 10° C in a 1 liter beaker was added 32.8 grams (0.42 moles) of 2-mercaptoethanol with rapid stirring. After the addition was complete, the reaction was stirred for 30 minutes and a solution of 38.6 grams (0.2 moles) of 2,2'-azobis(2-chloropropane) in 100 ml of pentane was added dropwise over 20 minutes. After the addition was complete, the reaction was stirred an additional 90 minutes at room temperature, poured into 500 ml of water, stirred until the salts dissolved and the pentane layer separated. The pentane layer was colorless and was discarded. The aqueous layer was extracted with 200 ml of CH$_2$Cl$_2$ and the CH$_2$Cl$_2$ extract was washed successively with water, 5% HCl, water, 10% NaHCO$_3$ and water. It was then dried over anhydrous sodium sulfate, filtered and the methylene chloride evaporated under reduced pressure leaving 31 grams (58% yield) of the desired product.

Di(4-t-butylazo-4,6-dimethyl-3-thiaheptyl)4,4'-Azobis(4-methyl-3-thiapentyl) Dicarbonate To a solution of 2.67 grams (0.01 moles) of 2,2'-azobis(2(β-hydroxyethylthio)propane) and 2.04 grams (0.02 moles) of triethylamine in 80 ml of methylene chloride cooled to 0° C in a 250 ml 3 neck flask equipped with a magnetic stirrer, thermometer, and addition funnel was added 6.15 grams (0.02 moles) of 4-t-butylazo-2,4-dimethyl-3-thiaheptyl chloroformate dropwise over 15 minutes holding the reaction temperature at 0°–5° C. After the addition was complete, the reaction was stirred an additional 60 minutes at 0°–5° C, poured into 150 ml cold water, the CH$_2$Cl$_2$ layer separated and washed successively with 5% HCl, water, 10% NaHCO₃ water, dried over anhydrous Na₂SO₄, filtered and the CH₂Cl₂ evaporated under reduced pressure to leave 6.1 grams (75% yield) of the desired product. The infrared spectrum of the product was in agreement with the structure of the desired compound.

EXAMPLE VII

Preparation of Di(4-t-butylazo-4-methyl-3-thiapentyl)4,4'-Azobis(4-cyanovalerate)

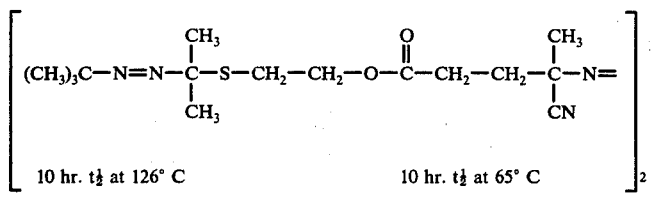

2-t-Butylazo-2-(β-hydroxyethylthio)propane was prepared as described in copending application Ser. No. 88,250, filed 11/9/70.

4,4'-Azobis(4-cyanovaleryl chloride) was prepared as described in copending application Ser. No. 37,311, filed 5/14/70.

Di(4-t-butylazo-4-methyl-3-thiapentyl)4,4'-azobis(4-cyanovalerate)

To a solution of 4.88 grams (0.0154 moles) of 4,4'-azobis(4-cyanovaleryl chloride) in 50 ml of methylene chloride in a 125 ml erlenmeyer flask, cooled to 20° C was slowly added a solution of 3.14 grams (0.0308 moles) of triethylamine in 6.27 grams (0.0380 moles) of 2-t-butylazo-2-(β-hydroxy-ethylthio)propane over 20 minutes holding the temperature at 20°–25° C. After the addition was complete, the reaction was stirred for 60 minutes at room temperature, poured into 100 ml of water and stirred until the salts dissolved. The methylene chloride layer was separated and washed successively with 5% HCl, water, 10% NaHCO₃, dried over anhydrous Na₂SO₄, filtered and the methylene chloride evaporated under reduced pressure to leave 10 grams (100% yield) of a yellow viscous liquid which slowly crystallized on standing. The infrared spectrum of the product was in agreement with the structure of the desired product.

EXAMPLE VIII

Preparation of 2-t-Butylazo-isopropyl 4-t-Butylazo-4-methyl-3-thiapentyl Carbonate

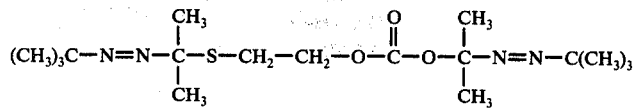

10 hr. t½ at 126° C          10 hr. t½ ~ 160° C 4-t-Butylazo-4-methyl-3-thiapentyl chloroformate was prepared from 2-t-butylazo-2-(β-hydroxyethylthio)propane and phosgene using the procedure described for the synthesis of 4-t-butylazo-4,6-dimethyl-3-thiaheptyl chloroformate in Example VIb.

2-t-Butylazo-isopropyl 4-t-butylazo-4-methyl-3-thiapentyl carbonate

To a slurry of 0.632 grams (0.015 moles) 57% sodium hydride in 60 ml of dioxane, cooled to 5° C in a 250 ml reaction flask equipped with a magnetic stirrer, thermometer, condenser and addition funnel, was added 2.16 grams (0.015 moles) of 2-t-butylazo-2-hydroxypropane dropwise holding the temperature at 5°–15° C. After the addition was complete, the reaction was stirred 30 minutes at 10° C and then 3.98 grams (0.015 moles) of 4-t-butylazo-4-methyl-3-thiapentyl chloroformate was added dropwise over a 15 minute period holding the temperature at 5°–10° C. After the addition was complete, the reaction was stirred for 45 minutes at room temperature, poured into 200 ml of cold water and the product extracted with pentane. The pentane solution was washed with cold water, 10% NaHCO₃, water, dried over anhydrous sodium sulfate, filtered and the pentane evaporated under reduced pressure to leave 2.9 grams (52% yield) of a yellow liquid. The infrared spectrum of the product was in agreement with the structure of the desired product.

EXAMPLE IX

Preparation of 2,2'-Azobis(5-(4-t-butylazo-4-cyanovaleroyloxy)-2-methyl-3-thiapentane)

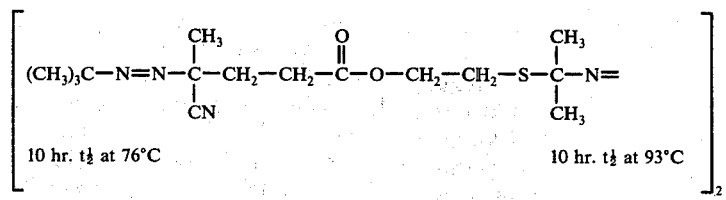

To a solution of 4.08 grams (0.0153 moles) of 2,2'-azobis(2-(β-hydroxyethylthio)-propane) (see Example VIc) and 3.11 grams (0.0306 moles) of triethylamine in 25 ml of methylene chloride, cooled to 20° C in a 125 ml erlenmeyer flask, was added a solution of 7.0 grams (0.0306 moles) of 4-t-butylazo-4-cyanovaleryl chloride in 25 ml of methylene chloride slowly over 10 minutes holding the reaction temperature at 20°-25° C. After the addition was complete the reaction was stirred for 60 minutes at room temperature, poured into 100 ml of water and the methylene chloride layer separated. The methylene chloride layer was successively washed with 10% HCl, water, 10% NaHCO₃, water, dried over anhydrous sodium sulfate, filtered and the methylene chloride evaporated under reduced pressure to leave 10.0 grams (100% yield) of a yellow viscous liquid. The infrared spectrum of the product was in agreement with the structure of the desired compound.

EXAMPLE X

Preparation of 2,2'-Azobis(7-t-butylazo-2,7,9-trimethyl-3-thia-6-oxa-decane)

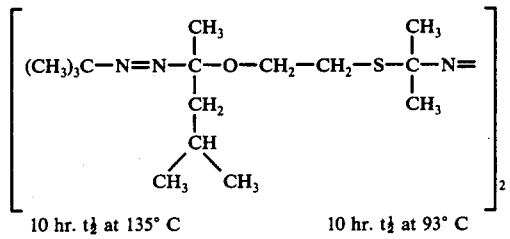

10 hr. t½ at 135° C    10 hr. t½ at 93° C 2-t-Butylazo-2-chloropropane was prepared as described in copending application Ser. No. 79,713, filed 10/9/70.

2,2'-Azobis(2-(β-hydroxyethylthio)propane) was prepared as described in Example VIc.

2,2'-Azobis(7-t-butylazo-2,7,9-trimethyl-3-thia-6-oxadecane)

To a slurry of 1.41 grams (0.0334 moles) of 57% sodium hydride in 80 ml of dimethylformamide in a 250 ml reaction flask equipped with a magnetic stirrer, thermometer, condenser and addition funnel, was slowly added 4.46 grams (0.0167 moles) of 2,2'-azobis(2-(β-hydroxyethylthio)propane). After the addition was complete, the reaction was stirred for 2 hours at room temperature and 6.81 grams (0.0334 moles) of 2-t-butylazo-2-chloro-4-methylpentane added dropwise over 15 minutes holding the temperature at 30°-35° C. After the addition was complete, the reaction was stirred for 90 minutes at room temperature and poured into 200 ml of ice water. The product was extracted with pentane. The pentane solution was washed with fresh water, dried over anhydrous Na₂SO₄, filtered and the pentane evaporated under reduced pressure to leave 8.3 grams (83% yield) of a yellow liquid. The infrared spectrum of the product was in agreement with the structure of the desired product.

EXAMPLE XI

Preparation of 6-Methyl-6-t-butylazo-5-oxaheptyl 4-t-Butylazo-4-cyanovalerate

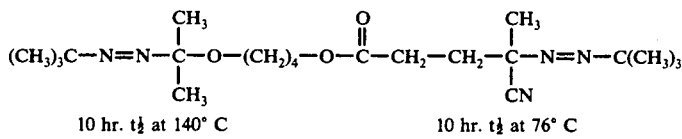

10 hr. t½ at 140° C    10 hr. t½ at 76° C 4-t-Butylazo-4-cyanovaleryl chloride was prepared as described in copending application Ser. No. 37,311 filed 5/14/70.

2-t-Butylazo-2-chloropropane was prepared as described in copending application Ser. No. 79,713, filed 10/9/70.

2-t-Butylazo-2-methyl-3-oxa-7-hydroxyheptane

To a slurry of 1.94 grams (0.046 moles) of 57% sodium hydride in 100 ml of dioxane in a 500 ml 3-neck flask equipped with a magentic stirrer, thermometer, condenser and addition funnel was added 4.19 grams (0.046 moles) of 1,4-butanediol. The reaction mixture stirred for 2 hours at room temperature and then 7.5 grams (0.046 moles) of 2-t-butylazo-2-chloropropane was added slowly over 20 minutes. The reaction mixture was stirred an additional 2 hours, poured into 250 ml of water and the product extracted with pentane. The pentane solution was washed with fresh water, dried over anhydrous Na₂SO₄, filtered and the pentane evaporated under reduced pressure to leave 7.0 grams (70% yield) of a yellow liquid. The infrared spectrum of the product was in agreement with the structure of the desired product.

6-Methyl-6-t-butylazo-5-oxaheptyl 4-t-Butylazo-4-cyanovalerate

To a solution of 6.5 grams (0.03 moles) of 2-t-butylazo-2-methyl-3-oxa-7-hydroxyheptane and 3.04 grams (0.03 moles) of triethylamine in 80 ml of methylene chloride, cooled to 20° C in an erlenmeyer flask, was added 6.8 grams (0.03 moles) of 4-t-butylazo-4-cyanovaleryl chloride dropwise over 10 minutes holding the reaction temperature at 20°-25° C. After the addition was complete, the reaction was stirred for an additional hour at room temperature, poured into 200 ml of cold water and the methylene chloride layer separated. The methylene chloride layer was washed with water, dried over anhydrous Na₂SO₄, filtered and the methylene chloride evaporated under reduced pressure to leave 9.5 grams (78% yield) of a yellow liquid. The infrared spectrum of the product was in agreement with the structure of the desired product.

EXAMPLE XII

Preparation of
2,2'-Azobis(5-(4-t-butylazo-4-(p-t-butylthiophenoxy)-valeroyloxy)-2-methyl-3-thiapentane $$\left[ (CH_3)_3C-N=N-\underset{\underset{\underset{C(CH_3)_3}{\bigcirc}}{S}}{\overset{CH_3}{\underset{|}{C}}}-CH_2-CH_2-\overset{O}{\overset{\|}{C}}-O-CH_2-CH_2-S-\underset{CH_3}{\overset{CH_3}{\underset{|}{C}}}-N= \right]_2$$

10 hr. t½ at 126° C            10 hr. t½ at 93° C 4-t-Butylazo-4-(p-t-butylthiophenoxy)valeroyl chloride was prepared as described in copending application Ser. No. 37,311, filed 5/14/70.

2,2'-Azobis(2-(β-hydroxyethylthio)propane) was prepared as described in Example VIc.

2,2'-Azobis(5-(4-t-butylazo-4-(p-t-butylthiophenoxy)-valeroyloxy)-2-methyl-3-thiapentane)

To a solution of 2.67 grams (0.01 moles) of 2,2'-azobis(2-(β-hydroxyethylthio)propane) and 2.02 grams (0.02 moles) of triethylamine in 25 ml of methylene chloride, cooled to 20° C in an erlenmeyer flask was added 7.36 grams (0.02 moles) of 4-t-butylazo-4-(p-t-butyl-thiophenoxy)valeryl chloride (dissolved in 25 ml of methylene chloride) dropwise over 15 minutes holding the temperature at 15°–20° C. After the addition was complete, the reaction was stirred for 1½ hours at room temperature, poured into 100 ml of water and the methylene chloride layer separated. The methylene chloride layer was washed with 5% HCl, water, 10% NaHCO₃, water, dried over anhydrous sodium sulfate, filtered and the methylene chloride evaporated under reduced pressure to leave 9.3 grams (100% yield) of a yellow liquid. The infrared spectrum of the product was in agreement with the structure of the desired product.

EXAMPLE XIII

Preparation of
2,7-Di(t-butylazo)-2,7-dimethyl-3-thia-6-oxaoctane $$(CH_3)_3C-N=N-\underset{CH_3}{\overset{CH_3}{\underset{|}{C}}}-S-CH_2-CH_2-O-\underset{CH_3}{\overset{CH_3}{\underset{|}{C}}}-N=N-C(CH_3)_3$$

10 hr. t½ at 126° C            10 hr. t½ at 140° C 2-t-Butylazo-2-(β-hydroxyethylthio)propane was prepared as described in copending application Ser. No. 88,250, filed 11/9/70.

2-t-Butylazo-2-chloropropane was prepared as described in copending application Ser. No. 79,713, filed 10/9/70.

2,7-Di(t-butylazo)-2,7-dimethyl-3-thia-6-oxaoctane

To a slurry of 1.27 grams (0.0303 moles) of 57% sodium hydride in 60 ml of dioxane in a 250 ml reaction flask equipped with a magnetic stirrer, thermometer, condenser and addition funnel, was added 6.18 grams (0.0303 moles) of 2-t-butylazo-2-(β-hydroxyethylthio)-propane slowly over 10 minutes at room temperature. After the addition was complete, the reaction mixture was stirred for 5 hours and then 4.93 grams (0.0303 moles) of 2-t-butylazo-2-chloropropane was added dropwise holding the temperature at 25° C ±5° C. After the addition was complete, the reaction mixture was stirred for 60 minutes at room temperature, poured into 200 ml cold water and the product extracted with pentane. The pentane solution was washed with water, dried over anhydrous sodium sulfate, filtered, stirred over alumina, filtered and the pentane evaporated under reduced pressure to leave 6.3 grams of crude product which was a mixture of the desired product and the starting materials. The product was then purified by column chromatography over alumina and eluting the product with pentane.

EXAMPLE XIV

Preparation of 4-t-Butylazo-4,6-dimethyl-3-thiaheptyl 3-(2-(t-Butylazo)isopropylthio)propionate $$(CH_3)_3C-N=N-\underset{CH_3}{\overset{CH_3}{\underset{|}{C}}}-S-CH_2-CH_2-\overset{O}{\overset{\|}{C}}-O-CH_2-CH_2-S-\underset{\underset{\underset{CH_3\ \ CH_3}{\diagup\diagdown}}{CH}}{\overset{CH_3}{\underset{|}{\underset{|}{C}}}}-N=N-C(CH_3)_3$$

10 hr. t½ at 126° C            10 hr. t½ at 113° C 2-t-Butylazo-2-chloropropane was prepared as described in copending application Ser. No. 79,713, filed 10/9/70.

Methyl 3(2-(t-Butylazo)isopropylthio)propionate

To a solution of 12.6 grams (0.105 moles) of methyl 3-mercaptopropionate in 50 ml of methanol, cooled to 5° C in an erlenmeyer flask immersed in an ice bath, was slowly added a solution of 6.59 grams (0.1 moles) of potassium hydroxide in 30 ml of methanol. After the addition was complete, the reaction mixture was stirred for 15 minutes and 17.7 grams (0.1 moles) of 92% 2-t-butylazo2-chloropropane was added dropwise over a 40 minute period holding the temperature at 10° C.

After the addition was complete, the reaction mixture was stirred for 40 minutes at room temperature, poured into 200 ml of cold water and the product extracted with pentane. The pentane solution was washed with water, dried over anhydrous sodium sulfate, filtered and the pentane evaporated under reduced pressure to leave 23.4 grams (95% yield) of a yellow liquid. The infrared spectrum of the product was in agreement with the structure of the desired product.

Preparation of 3-(2-(t-Butylazo)isopropylthio)propionic Acid

To a solution of 8.8 grams (0.11 moles) of 50% sodium hydroxide in 35 ml of methanol was slowly added 24.6 grams (0.1 moles) of methyl S(2-t-butylazoisopropyl)thiopropionate and the reaction mixture stirred for 90 minutes at room temperature. The reaction mixture was poured into 200 ml of cold water and the solution extracted with methylene chloride to remove any unreacted ester. The aqueous solution was acidified with conc. HCl to a pH of 2 and extracted with 75 ml of pentane. The pentane extract was washed with water, dried over anhydrous sodium sulfate, filtered and the pentane evaporated to leave 19.5 grams (84% yield) of a yellow solid (m.p. 44°-47° C). The infrared spectrum of the product was in agreement with the structure of the desired product.

Preparation of 3-(2-(t-Butylazo)isopropylthio)propionyl Chloride

To a solution of 10 grams (0.043 moles) of S(2-t-butylazoisopropyl)thiopropionic acid in 50 mls of methylene chloride, cooled to 5° C in a 100 ml reaction flask equipped with a magnetic stirrer, condenser, thermometer and connected to a bubbler containing 20% sodium hydroxide, was added 9.4 grams (.045 moles) of phosphorous pentachloride slowly over 5 minutes. The temperature rose to 28° C over this period. The reaction was stirred an additional 1¼ hours and then poured into 200 ml of ice cold water and stirred for 30 seconds. The CH₂Cl₂ layer was quickly separated, washed successively with 200 ml of water, 5% NaHCO₃ for 30 seconds each, dried over anhydrous sodium sulfate, filtered and the methylene chloride evaporated under reduced pressure to leave 9.1 grams (85.6% yield) of a dark yellow liquid. The infrared spectrum of the product was in agreement with the structure of the desired product.

Preparation of 4-t-Butylazo-4, 6-dimethyl-3-thiaheptyl 3-(2-(t-Butylazo)-isopropylthio)propionate To a solution of 1.96 grams (0.008 moles of 2-t-butylazo-2-(β-hydroxyethylthio)-4-methylpentane and 0.81 grams (0.008 moles) of triethylamine in 20 ml of pentane in a 50 ml erlenmeyer flask was added 2.0 grams (.008 moles) of S(2-t-butylazoisopropyl)thiopropionyl chloride dropwise over a 15 minute period holding the reaction temperature at 25° C ± 3° C with a water bath. After the addition was complete, the reaction mixture was stirred and additional 60 minutes, poured into 50 ml of water and the pentane layer separated. The pentane solution was washed with water, dried over anhydrous sodium sulfate, filtered and the pentane evaporated under reduced pressure to leave 2.8 grams (76% yield) of a dark orange viscous liquid. The infrared spectrum of the product was in agreement with the structure of the desired product and there was no evidence of the starting materials.

Example XV

Preparation of 2,2'-Azobis(5-(5-t-butylazo-5-methyl-4-thiahexanoyloxy)-2-methyl-3-thiapentane

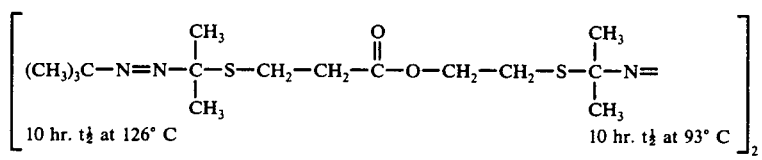

3(2-(t-Butylazo)isopropylthio)priopionyl chloride was prepared as described in Example XIV. 2,2'-Azobis(2(β-hydroxyethylthio)propane) was prepared as described in Example VIc.

2,2'-Azobis(5-(5-t-butylazo-5-methyl-4-thiahexanoyloxy)-2-methyl-3-thiapentane)

To a solution of 1.06 grams (.004 moles) of 2,2'-azobis(2-(β-hydroxyethylthio)propane) and 0.81 grams (.008 moles) of triethylamine in 20 ml of methylene chloride in a 50 ml erlenmeyer flask was added 2.0 grams (.008 moles) of S(2-t-butylazoisopropyl)-thiopropionyl chloride dropwise over a 15 minute period holding the reaction temperature at 25° C ± 3° C with a water bath. After the addition was complete, the reaction mixture was stirred an additional 60 minutes, poured into 50 ml of water and the methylene chloride layer separated. The methylene chloride solution was washed with water, dried over anhydrous sodium sulfate, filtered and the methylene chloride evaporated under reduced pressure to leave 1.9 grams (99% yield) of an orange viscous liquid. The infrared spectrum of the product was in agreement with the structure of the desired product and there was no evidence of the starting materials.

EXAMPLE XVI

Preparation of 2-t-Butylazoisopropyl 3(2-(t-Butylazo)isopropylthio)propionate

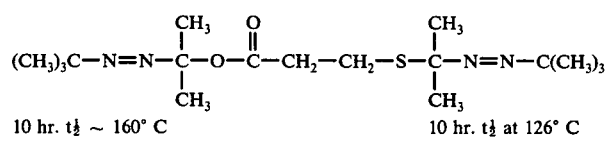

2-t-Butylazo-2-chloropropane was prepared as described in copending application Ser. No. 79,713, filed 10/9/70. 3-(2-(t-Butylazo)isopropylthio)propionic Acid was prepared as described in Example XIVc.

2-t-Butylazoisopropyl
3-(2-(t-Butylazo)isopropylthio)propionate

To a solution of 3.24g. (.014 moles) of S(2-t-butylazoisopropyl)thiopropionic acid in 30 ml of methanol in a 125 ml erlenmeyer flask was added 1.12 grams (.014 moles) dropwise and the reaction mixture stirred 20 minutes. The reaction mixture was cooled to 20° C and 2.53 grams (.014 moles) of 93% 2-t-butylazo-2-chloropropane added slowly holding the reaction temperature at 20° C. After the addition was complete, the reaction was stirred for an additional 60 minutes at room temperature, poured into 100 ml of water and the product extracted with 50 ml of pentane. The pentane solution was washed with water, dried over anhydrous sodium sulfate, filtered and the pentane evaporated under reduced pressure to leave 4.7 grams (94% yield) of a yellow liquid. The infrared spectrum of the product was in agreement with the structure of the desired compound.

EXAMPLE XVII

Preparation of
2,7-Di(t-butylazo)-2-methyl-3-oxa-7-cyanooctane

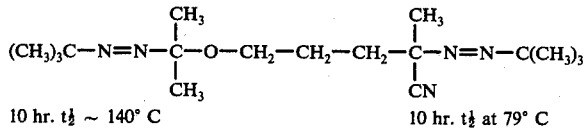

2-t-Butylazo-2-chloropropane was prepared as described in copending application Ser. No. 79,713, filed 10/9/70. 2-t-Butylazo-2-cyano-5-hydroxypentane was prepared as described in Example XIV of copending application Ser. No. 37,311, filed 5/14/70.

2,7-Di(t-butylazo)-2-methyl-3-oxa-7-cyanooctane

To a slurry of 0.652 grams (.0155 moles) of 57% sodium hydride in 30 ml of dimethylformamide in a 250 ml reaction flask equipped with a magnetic stirrer, thermometer, gas outlet and addition funnel was added 3.06 grams (0.0155 moles) of 2-t-butylazo-2-cyano-5-hydroxypentane dropwise. After the addition was complete, the reaction was stirred for 3½ hours at room temperature and then 2.8 grams (0.0155 moles) of 93% 2-t-butylazo-2-chloropropane was added dropwise at room temperature. After the addition was complete, the reaction was stirred for 60 minutes at room temperature, poured into 150 ml of water and the product extracted with pentane. The pentane solution was washed with water, dried over anhydrous sodium sulfate, filtered and the pentane evaporated under reduced pressure to leave 4.1 grams (82% yield) of an orange liquid. The infrared red spectrum of the product was in agreement with the structure of the desired product.

EXAMPLE XVIII

Preparation of
Di(4-t-butylazo-4,6-dimethyl-3-thiaheptyl)
4,4'-Azobis(4-cyanovalerate)

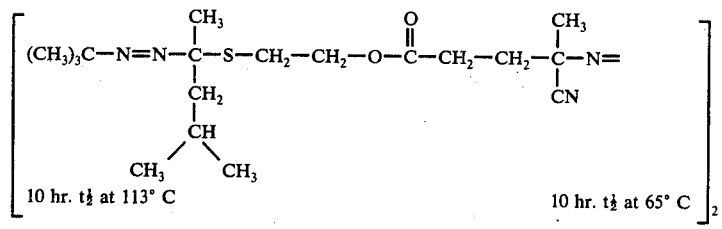

The above compound was prepared in 100% yield from 2-t-butylazo-2-(β-hydroxyethylthio)-4-methylpentane and 4,4'-azobis(4-cyanovaleryl chloride). The procedure was the same as that described in Example VII.

What is claimed is:

1. A process for preparing a block copolymer which comprises (a) forming a polymer having azo functions present by reacting vinyl polymer and a polyazo compound under vinyl polymerization conditions controlled to cause one type of azo function to rupture leaving the other type or azo function intact, said rupture having the effect of initiating polymerization of said vinyl polymer; and (b) reacting vinyl monomer with the polymer step (a) under conditions to rupture the azo function of said step (a) polymer to produce a block copolymer, said polyazo compound having the formula , $(C-N=N-A-B-A'-N)_n (N-C')_{2-n}$ where:

(a) $n = 1$ or 2;
(b) C and C' are different unless—A—B—A'—is unsymmetrical and are selected from

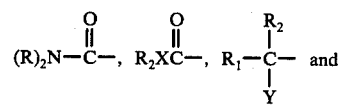

aryl of 6-14 carbons;
(c) A and A' are the same or different, at least one being

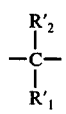

and the other being selected from

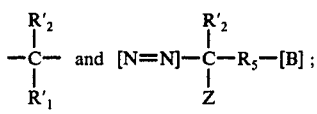

(d) B is selected from

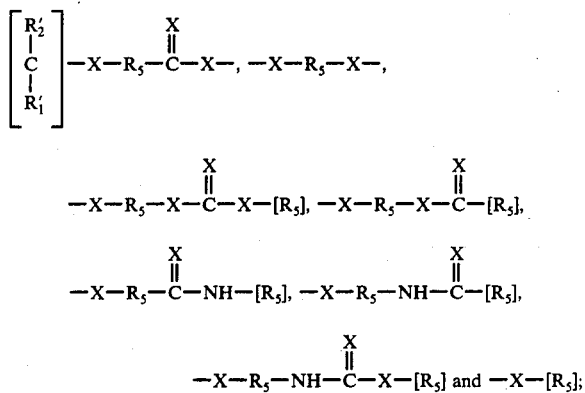

(e) X is sulfur or oxygen;

(f) Y is selected from lower alkyl of 1-4 carbons, —CN,

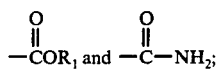

(g) Z is selected from —CN, —Cl,—Br, —N₃, —XCN, —R₁,

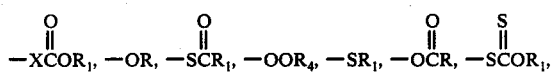

-continued

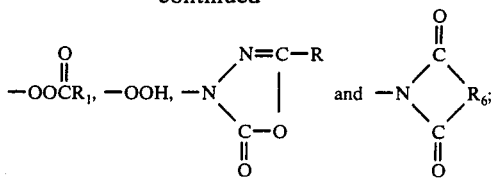

(h) R is selected from hydrogen, lower alkyl of 1-6 carbons and aryl of 6-14 carbons;

(i) $R_1$ and $R'_1$ are the same or different and are selected from alkyl of 1-8 carbons, cycloalkyl of 3-10 carbons, aralkyl of 7-12 carbons and aryl of 6-14 carbons;

(j) $R_2$ and $R'_2$ are the same or different and are alkyl of 1-10 carbons or cycloalkyl of 3-10 carbons;

(k) $R_1$ and $R_2$, $R'_2$ and $R_5$ and $R'_1$ and $R'_2$ when taken together with the tertiary carbon linked to the azo group, form a cycloalkyl of 4-12 carbons;

(l) $R_4$ is tertiary-alkyl of 4-8 carbons;

(m) $R_5$ is a diradical selected from alkyl of 1-12 carbons terminated by carbon atoms and containing 0-1 carbonyls and 0-4 nonadjacent oxygen, sulfur and nitrogen atoms in its backbone structure, alkylcycloalkyl or alkylcycloalkylalkyl of up to 12 carbons aralkyl of 7-12 carbons and phenyl; and (n) $R_6$ is selected from lower akylene and cycloalkylene of 2-10 carbons, and an aromatic radical of 6-12 carbons.

2. The process of claim 1 wherein the monomer of step (a) is styrene and the monomer of step (b) is methyl methacrylate.

3. The process of claim 2 wherein the polyazo compound is 4-t-butylazo-4-methyl-3-thiapentyl 4-t-butylazo-4-cyanovalerate.

4. The process of claim 2 wherein the polyazo compound is 4-t-butylazo-4,6-dimethyl-3-thiaheptyl 4-t-butylazo-4-cyanovalerate.

* * * * *

UNITED STATES PATENT OFFICE
CERTIFICATE OF CORRECTION

Patent No. 4,075,286            Dated February 21, 1978

Inventor(s) MacLeay et al

It is certified that error appears in the above-identified patent and that said Letters Patent are hereby corrected as shown below:

Column 1, line 46,

"$(C-N=N-A-B-A'-N)_n(N-C')_{2-n}$" should read --$(C-N=N-A-B-A'-N\!\!=\!\!)_{\overline{n}} (N-C')_{2-n}$--

Column 42, line 35,

"$(C-N=N-A-B-A'-N)_n(N-C')_{2-n}$" should read --$(C-N=N-A-B-A'-N\!\!=\!\!)_{\overline{n}} (N-C')_{2-n}$--

Signed and Sealed this

Sixth Day of June 1978

[SEAL]

Attest:

RUTH C. MASON
*Attesting Officer*

DONALD W. BANNER
*Commissioner of Patents and Trademarks*